(12) United States Patent
Socha et al.

(10) Patent No.: US 7,803,338 B2
(45) Date of Patent: Sep. 28, 2010

(54) METHOD AND APPARATUS FOR COMBINATION CATALYST FOR REDUCTION OF $NO_x$ IN COMBUSTION PRODUCTS

(75) Inventors: Richard F. Socha, Newtown, PA (US); James C. Vartuli, Schwenksville, PA (US); El-Mekki El-Malki, Princeton, NJ (US); Mohan Kalyanaraman, Media, PA (US); Paul W. Park, Peoria, IL (US)

(73) Assignees: ExonMobil Research and Engineering Company, Annandale, NJ (US); Caterpillar Inc., Peoria, IL (US)

( * ) Notice: Subject to any disclaimer, the term of this patent is extended or adjusted under 35 U.S.C. 154(b) by 394 days.

(21) Appl. No.: 11/157,729

(22) Filed: Jun. 21, 2005

(65) Prior Publication Data
US 2006/0286012 A1    Dec. 21, 2006

(51) Int. Cl.
| | |
|---|---|
| *B01D 53/56* | (2006.01) |
| *B01D 53/86* | (2006.01) |
| *B01D 50/00* | (2006.01) |
| *B01D 53/34* | (2006.01) |
| *B01J 8/00* | (2006.01) |
| *B01J 29/06* | (2006.01) |
| *B01J 23/00* | (2006.01) |
| *B01J 23/04* | (2006.01) |
| *B01J 23/48* | (2006.01) |
| *B01J 23/50* | (2006.01) |
| *C01B 21/00* | (2006.01) |

(52) U.S. Cl. ............... 423/239.1; 423/239.2; 422/177; 502/71; 502/184; 502/344; 502/347

(58) Field of Classification Search ............. 423/239.1; 422/177; 502/60, 415, 347, 184, 344
See application file for complete search history.

(56) References Cited

U.S. PATENT DOCUMENTS 4,828,679 A * 5/1989 Cormier et al. ........ 208/120.05

(Continued)

FOREIGN PATENT DOCUMENTS

EP    0702 997 A1    3/1996

(Continued)

OTHER PUBLICATIONS

Rappe et al. "Comibnation of low and high temperature catalytic materials to obtain broad temperature coverage for plasma-facilitated NOx reduction" Catalysis Today 89 (Feb. 3, 2004) pp. 143-150.*

(Continued)

*Primary Examiner*—Jerry Lorengo
*Assistant Examiner*—Jennifer A Smith
(74) *Attorney, Agent, or Firm*—Watov & Kipnes, P.C.; Kenneth Watov

(57) ABSTRACT

A method and apparatus for catalytically processing a gas stream passing therethrough to reduce the presence of $NO_x$ therein, wherein the apparatus includes a first catalyst composed of a silver containing alumina that is adapted for catalytically processing the gas stream at a first temperature range, and a second catalyst composed of a copper containing zeolite located downstream from the first catalyst, wherein the second catalyst is adapted for catalytically processing the gas stream at a lower second temperature range relative to the first temperature range.

15 Claims, 7 Drawing Sheets

U.S. PATENT DOCUMENTS

| | | | |
|---|---|---|---|
| 4,934,142 A * | 6/1990 | Hayashi et al. | 60/297 |
| 5,223,236 A * | 6/1993 | Inoue et al. | 423/213.2 |
| 5,374,409 A * | 12/1994 | Kasahara et al. | 423/213.2 |
| 5,425,332 A | 6/1995 | Rabinovich et al. | |
| 5,437,250 A | 8/1995 | Rabinovich et al. | |
| 5,443,803 A | 8/1995 | Mizuno et al. | |
| 5,599,758 A | 2/1997 | Guth et al. | |
| 5,714,130 A | 2/1998 | Saito et al. | 423/239.1 |
| 5,727,385 A | 3/1998 | Hepburn | 60/297 |
| 5,741,468 A * | 4/1998 | Saito et al. | 423/239.1 |
| 5,776,423 A * | 7/1998 | Feeley et al. | 423/239.2 |
| 5,780,002 A | 7/1998 | Miyadera et al. | 423/239.1 |
| 5,878,567 A | 3/1999 | Adamczyk et al. | 60/274 |
| 5,882,607 A | 3/1999 | Miyadera et al. | 422/177 |
| 5,908,806 A * | 6/1999 | Kharas | 502/64 |
| 5,910,097 A | 6/1999 | Boegner et al. | |
| 5,921,076 A | 7/1999 | Krutzsch et al. | |
| 5,948,377 A | 9/1999 | Sung | |
| 5,980,844 A * | 11/1999 | Kharas | 423/213.2 |
| 6,029,623 A * | 2/2000 | Weissman et al. | 123/299 |
| 6,125,629 A | 10/2000 | Patchett | 60/286 |
| 6,176,078 B1 | 1/2001 | Balko et al. | |
| 6,245,307 B1 | 6/2001 | Inui et al. | |
| 6,260,353 B1 | 7/2001 | Takahashi | |
| 6,314,722 B1 | 11/2001 | Matros et al. | 60/274 |
| 6,363,716 B1 | 4/2002 | Balko et al. | |
| 6,475,350 B2 | 11/2002 | Palekar et al. | |
| 6,560,958 B1 | 5/2003 | Bromberg et al. | |
| 6,592,833 B1 | 7/2003 | Kharas | 423/239.1 |
| 6,679,051 B1 | 1/2004 | Van Nieustadt et al. | |
| 6,703,343 B2 | 3/2004 | Park | 502/355 |
| 6,706,660 B2 | 3/2004 | Park | 502/304 |
| 6,718,753 B2 | 4/2004 | Bromberg et al. | |
| 6,758,035 B2 | 7/2004 | Smaling | |
| 6,810,658 B2 | 11/2004 | Kaupert et al. | |
| 6,823,662 B1 | 11/2004 | Yamamoto et al. | |
| 6,843,054 B2 | 1/2005 | Taylor, III et al. | |
| 6,846,471 B2 | 1/2005 | Hotta et al. | |
| 6,895,746 B2 | 5/2005 | Buglass et al. | |
| 6,957,528 B1 | 10/2005 | Cho | |
| 6,959,542 B2 | 11/2005 | Taylor, III et al. | |
| 6,968,678 B2 | 11/2005 | Le Leux et al. | |
| 7,063,642 B1 | 6/2006 | Hu et al. | 477/100 |
| 7,093,428 B2 | 8/2006 | LeBarge et al. | 60/286 |
| 7,743,602 B2 | 6/2010 | Kalyanaraman | 60/286 |
| 2001/0031699 A1 * | 10/2001 | Matsumoto et al. | 502/303 |
| 2002/0051742 A1 | 5/2002 | Hotta et al. | |
| 2002/0091061 A1 | 7/2002 | Labarge et al. | |
| 2003/0047146 A1 | 3/2003 | Daniel et al. | |
| 2003/0047147 A1 | 3/2003 | Daniel et al. | |
| 2003/0089337 A1 | 5/2003 | Cohn et al. | |
| 2003/0118960 A1 | 6/2003 | Balmer-Millar et al. | |
| 2003/0170154 A1 | 9/2003 | Inman et al. | 422/186.04 |
| 2004/0050345 A1 | 3/2004 | Bauer | |
| 2004/0099226 A1 | 5/2004 | Bromberg et al. | |
| 2004/0126286 A1 | 7/2004 | DeRuyter | |
| 2004/0146458 A1 | 7/2004 | Weissman et al. | |
| 2004/0187483 A1 | 9/2004 | Betta et al. | |
| 2004/0235651 A1 | 11/2004 | Uenishi et al. | |
| 2005/0229872 A1 | 10/2005 | Lange | |
| 2005/0247049 A1 | 11/2005 | Kaboord et al. | |
| 2006/0112678 A1 | 6/2006 | Kaboord et al. | |
| 2006/0286012 A1 * | 12/2006 | Socha et al. | 422/177 |
| 2007/0059223 A1 | 3/2007 | Golunski et al. | |

FOREIGN PATENT DOCUMENTS

| | | |
|---|---|---|
| EP | 0 730 900 A1 | 9/1996 |
| EP | 0971102 | 1/2000 |
| EP | 1094206 | 4/2001 |
| EP | 1 132 585 A2 | 9/2001 |
| EP | 1893321 B1 | 4/2010 |
| JP | 05103953 A | 4/1993 |
| JP | 06238169 A | 8/1994 |
| JP | 07194973 A | 8/1995 |
| JP | 09057064 A | 3/1997 |
| JP | 09085057 A | 3/1997 |
| JP | 09253484 A * | 9/1997 |
| JP | 10328567 A | 12/1998 |
| WO | WO 00/64566 | 11/2000 |
| WO | WO 2005/016496 A1 * | 2/2005 |

OTHER PUBLICATIONS

Shigeo Satokawa et al., "Promotion Effect of H2 on the Low Temperature Activity of the Selective reduction of NOx by Light Hydrocarbons over Ag/Al2O3," www.sciencedirect.com; Elsevier Applied Catalysis B: Environmental 42 (2003), Aug. 30, 2002, pp. 179-186.

Richter et al., "The Effect of Hydrogen on selective Catalytic Reduction of NO In Excess Oxygen over Ag/Al2O3," www.sciencedirect.com, Elsevier Applied Catalysis B: Environmental 51 (2004), Apr. 24, 2004, pp. 261-274.

Cavataio et al., "Selective Catalytic Reduction of NOx over Silver and Platinum Alumina Catalysts," CLEERS Workshop, University of Michigan, Ford Motor Company, May 2, 2002, pp. 1-31.

Eranen et al., "Continuous Reduction of NO with Octane over Silver/Alumina Catalyst in Oxygen-Rich Exhaust Gases: Combined Heterogenous and Surface-Mediated Homogenous Reactions," www.sciencedirect.com, Academic Press, Journal of Catalysis 219 (2003), Apr. 18, 2003, pp. 25-40.

Arve et al., "Kinetic Considerations of H2 assisted Hydrocarbon Selective Catalytic Reduction of NO over Ag/Al2O3 I. Kinetic Behavior," www.sciencedirect.com, Applied Catalysis A: General 303 (2006) Mar. 9, 2006, pp. 96-102.

* cited by examiner

METHOD AND APPARATUS FOR COMBINATION CATALYST FOR REDUCTION OF $NO_x$ IN COMBUSTION PRODUCTS

STATEMENT OF GOVERNMENT INTEREST

This invention was made with Government support under DOE Contract No. DE-AC05-00OR22725 awarded by the U.S. Department of Energy. Accordingly, the Government may have certain rights to this invention.

RELATED APPLICATION

The present invention is related to that of co-pending Ser. No. 11/514,544, filed on Sep. 1, 2006, for "Reformer Assisted Lean NOx Catalyst Aftertreatment System And Method."

FIELD OF THE INVENTION

The present invention relates generally to methods and apparatus for removing pollutant gases from the exhaust gas stream formed by a combustion process such as required in the operation of internal combustion engines, furnaces, power plants, and so forth, and is more particularly related to catalysts used in removing nitrogen oxide ($NO_x$) from the exhaust gases resulting from a combustion process.

BACKGROUND OF THE INVENTION

A continuing effort has been made over the years for developing methods and systems for removing pollutant gases from exhaust gases produced by combustion equipment. In recent years, environmental regulations have been made law in numerous countries around the world in an effort to reduce the emission of pollutant gases into the atmosphere from combustion equipment. Of major concern is the production of nitrogen oxides ($NO_x$) by motor vehicles driven by internal combustion engines, such as gasoline driven engines, and particularly diesel engines. Other combustion apparatus are also of concern, such as furnaces installed in factories, commercial and home heating devices, power plant equipment, and so forth.

During the combustion process in such equipment when nitrogen in the air reacts with oxygen within a combustion chamber, under the high temperature and pressure conditions that typically exist therein, such as in the cylinder of an internal combustion engine, nitrogen oxides ($NO_x$) are produced, which typically include either one or a combination of nitrogen monoxide and nitrogen dioxide, commonly referred to as $NO_x$ emissions. The $NO_x$ emissions are major atmospheric pollutants that cause smog, and acid rain. The major industrialized countries throughout the world have instituted regulations for reducing $NO_x$ emissions.

As a result, a major effort has been ongoing over an extended period of time for developing methods and systems to substantially eliminate the emission into the atmosphere of nitrogen oxides or $NO_x$ via exhaust gas streams from combustion equipment. Recognizing that automobile emissions are a major source of air pollution, in the 1966 automobile model year, the state of California passed regulations requiring the use of exhaust emission control systems in vehicles sold in California. Similar regulations were instituted throughout the United States by automotive model year 1968.

In combustion processes, the "perfect mixture" of a fuel and air is referred to in thermodynamics by the term "stoichiometric." This is the point at which the amount of air is just enough to combust all of the fuel, with no excess oxygen remaining. For many reasons, internal combustion engines cannot be run stoichiometrically, and are typically run lean, where there is an excess of oxygen to fuel relative to the stoichiometric condition. Although both gasoline and diesel internal combustion engines are typically run as lean-burn engines, such a condition is most often found in operating diesel engines, and leads to the emission of undesirable amounts of $NO_x$ in the exhaust gases from such engines. At times engines may run rich, that is with an excess of fuel relative to oxygen. Note that for gasoline, the stoichiometric mixture is 14.6:1. Even under these conditions, some nitrogen from the air can react with oxygen to form NOx The exhaust gas stream from lean-burn engines contain significant amounts of oxygen, thereby preventing the efficient removal of $NO_x$ from the gas stream through use of conventional exhaust catalysts such as a "3-Way Catalyst." As a result, $NO_x$ trap or $NO_x$ storage/reduction systems have been developed to assist in removing $NO_x$ from current lean-burn engines. However, these systems must rely on close engine control for alternating between rich and lean conditions in the exhaust gas stream. During the lean phases, the catalyst employed stores $NO_x$. During the rich phases, the catalyst reduces $NO_x$ to $N_2$. Also, HC-SCR systems have been developed as retrofits for use in reducing $NO_x$ from the exhaust gas stream of internal combustion engines, but such systems have found only limited use.

Accordingly, there is a need in the art for improved methods and apparatus for removing $NO_x$ from the exhaust gas stream of a combustion device, such as internal combustion engines.

SUMMARY OF THE INVENTION

The present invention relates to a method and apparatus for catalytically processing a gas stream to remove or at least substantially reduce $NO_x$ compounds therefrom. The apparatus of the present invention provides an efficient means for reducing or eliminating $NO_x$ compounds in exhaust gases produced by an internal combustion engine. In particular, the apparatus of the present invention efficiently processes the exhaust gases from lean-burn engines such as diesel engines, for example, whose exhaust gases exhibit a relatively large proportion of oxygen content. The present invention makes use of a combination of a first catalyst that exhibits $NO_x$ conversion activity at a relatively high temperature with a second catalyst that exhibits at least similar activity at a lower temperature to yield a synergistic result. The present invention is characterized by a broader temperature range of operation and enhanced gas stream processing capacity. More particularly, the present invention makes use of catalyst combinations that result in a synergistic effect, better than the sum of the parts by producing the correct set of intermediate nitrogen compounds on the first catalyst, and reducing these over the second catalyst.

The apparatus of the present invention comprises generally a first catalyst adapted to operate at an optimal first temperature, and a second catalyst adapted to operate at a lower optimal second temperature relative to the first temperature. The first catalyst is positioned upstream from the second catalyst in a manner which enables the exhaust gases in the form of a gas stream to flow from the first catalyst to the second catalyst. The first and second catalysts may be arranged immediately one after another or in a spaced-apart relationship.

In one embodiment of the present invention, a reductant generally in the form of a hydrocarbon compound is introduced into the gas stream to further enhance the $NO_x$ removal activity of the apparatus via hydrocarbon-selective catalytic reduction (HC-SCR).

In a preferred embodiment of the present invention, the first catalyst is composed of a metal containing alumina material, and the second catalyst is composed of a metal containing zeolite material. During operation, the exhaust gases are passed through the apparatus and sequentially processed by the first and second catalysts. The first and second catalysts, in combination, operate to remove or at least substantially reduce the NOx compounds and convert them into environmentally compatible by-products in a simple, cost efficient manner.

In one aspect of the present invention, there is provided an apparatus for catalytically processing a gas stream passing therethrough to reduce the presence of NOx therein, the apparatus comprising:

a first catalyst having a first optimal processing temperature range for catalytically processing the gas stream; and a second catalyst located downstream from the first catalyst, said second catalyst having a second lower optimal processing temperature range relative to the first temperature range for catalytically processing the gas stream subsequent to the first catalyst.

In a particular aspect of the present invention, there is provided an apparatus for catalytically processing a gas stream passing therethrough to reduce the presence of $NO_x$ therein, the apparatus comprising:

a first catalyst comprising metal containing alumina, said first catalyst having a first optimal processing temperature range for catalytically processing the gas stream; and a second catalyst comprising metal containing zeolite located downstream from the first catalyst, said second catalyst having a second lower optimal processing temperature range relative to the first optimal processing temperature range for catalytically processing the gas stream subsequent to the first catalyst.

In another aspect of the present invention, there is provided a method for catalytically processing a gas stream to reduce the presence of $NO_x$ therein, said method comprising:

delivering the gas stream to a first catalyst having a first optimal processing temperature range for catalytically processing the gas stream; and conveying the gas stream from the first catalyst to a second catalyst, wherein said second catalyst has a lower second optimal processing temperature range relative to the first optimal processing temperature range for catalytically processing the gas stream subsequent to the first catalyst.

BRIEF DESCRIPTION OF THE DRAWINGS

Various embodiments of the invention are described in detail below with reference to the drawings, in which like items are identified by the same reference designation, wherein.

DETAILED DESCRIPTION OF THE INVENTION

The present invention is directed to method and apparatus for catalytically processing a gas stream to remove or at least substantially reduce $NO_x$ compounds therefrom. The apparatus and method of the present invention provides an efficient means for reducing or eliminating $NO_x$ compounds in exhaust gases produced from an internal combustion engine. The apparatus and method of the present invention is designed to promote the catalytic conversion of $NO_x$ compounds present in the exhaust gases into environmentally compatible products. The apparatus of the present invention has been observed to yield a synergistic effect utilizing a combination of first and second catalysts in the presence of a reductant generally in the form of a hydrocarbon, while using minimal packaging space. It is envisioned that the apparatus disclosed herein is suitable for use in lean $NO_x$ exhaust aftertreatment systems.

The present invention is designed to promote a synergistic effect from the combination of different catalysts by tailoring the intermediate reactant species, producing ammonia, amines, nitrites and other organo-nitrogen species. The present invention is capable of generating higher NOx reduction performance, while maintaining the same packaging volume and space velocity.

Figure 1:
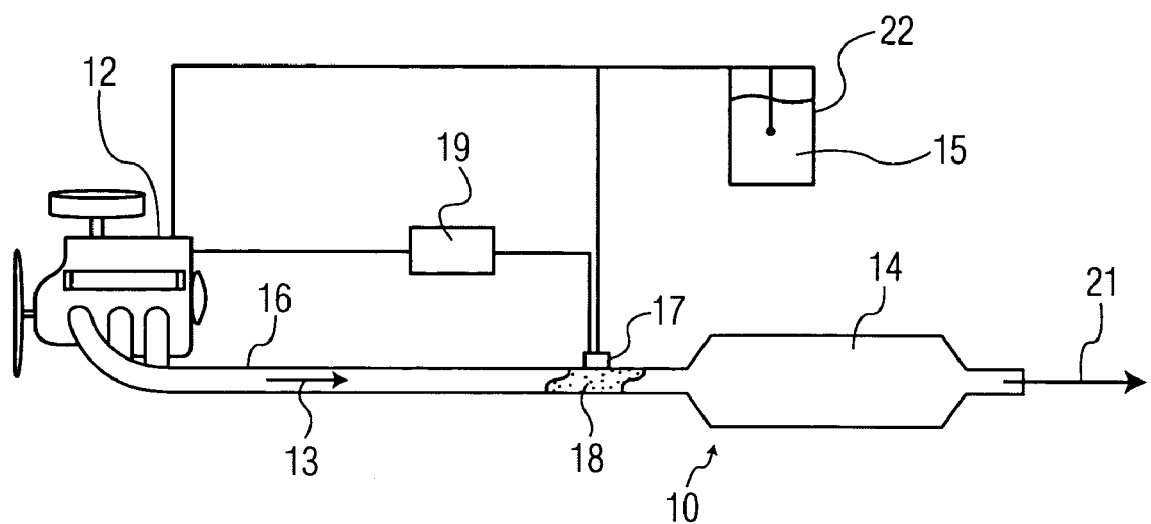
FIG. 1 is a schematic diagram illustrating the application of an apparatus for catalytically processing a gas stream to remove or at least substantially reduce $NO_x$ compounds therefrom, and adapted for use with a diesel engine in accordance with one embodiment of the present invention.

Referring to FIG. 1, a schematic diagram showing an apparatus of the present invention identified by reference numeral 10 coupled to a "lean burn" engine 12 in the form of a diesel engine. As used herein, a "lean burn engine" is defined as one that produces an oxygen-rich exhaust, which is defined as an exhaust having a higher molar ratio of oxygen than the total molar ratio of reductive compounds such as CO, hydrogen and hydrocarbons. The exhausts have an oxidative environment. Examples of such engine systems include diesel engine systems, spark ignited natural gas or alternative fuel engine systems, liquid or gaseous fueled turbine engines, and various lean burn gasoline engine systems. Generally, diesel engine systems, as shown in FIG. 1 generate an exhaust having an oxygen content of from 4% to 16% depending on the load conditions and the running mode of the diesel engine.

An oxygen rich exhaust 13 exits engine 12 and is directed to the apparatus 10. Preferably, this exhaust is supplemented by the addition of a reductant in the form of an atomized hydrocarbon or mixture of hydrocarbons 18. In the illustrated embodiment, one source of these hydrocarbons can be the diesel fuel 15 in a tank 2 used as the primary source of fuel for the diesel engine 12. The hydrocarbon reductants can be the residual hydrocarbons remaining in the exhaust after the combustion event during an engine cycle. Alternatively, the supplemental hydrocarbons can be introduced as a post injection event, preferably during the power stroke or exhaust stoke of a four stroke diesel engine. Yet another alternative, as illustrated, is to introduce the supplemental hydrocarbon in the exhaust system at a location downstream of the engine cylinders using an auxiliary injector 17 controlled by the engine control module (ECM) 19. It is also well known to use hydrocarbons other than the primary diesel fuel.

The engine exhaust is directed to the apparatus 10 comprising a catalytic unit 14. Deposited within the catalytic unit 14 is a combination of metal containing catalysts having the customized physical and chemical characteristics disclosed herein, that yield both high $NO_x$ removing performance, as well as other advantageous lean $NO_x$ catalyst performance characteristics. The composition of the combination of metal containing catalysts as well as the catalytic reactions is described in greater detail below.

Figure 2:
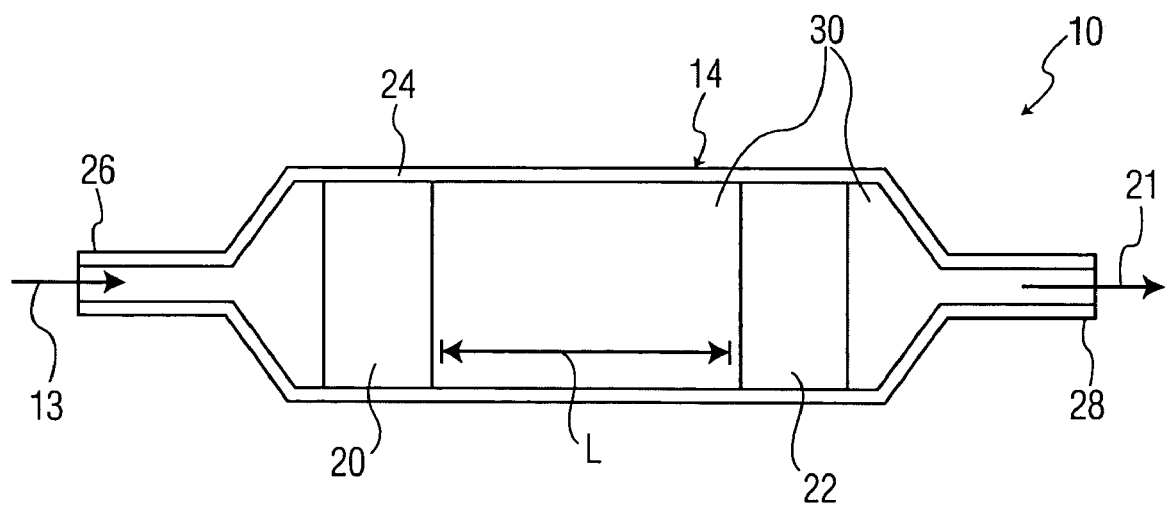
FIG. 2 is a longitudinal cross sectional view of an apparatus for catalytically processing a gas stream to remove or at least substantially reduce $NO_x$ compounds therefrom in accordance with one embodiment of the present invention.

Referring to FIG. 2, the apparatus 10 includes a catalytic unit 14 which is placed downstream from the lean burn engine 12 along the outgoing exhaust pipe 16. The exhaust 13 in the form of a gas stream (represented by an arrow) from the engine 12 is conducted along the exhaust pipe 16 in the direction indicated by the associated arrow in FIG. 2. For one embodiment of the present invention, the apparatus 10 includes an airtight housing 24 defining a packaging volume 30 occupied by the catalytic unit 14, an inlet port 26 at one end, and a outlet port 28 at the opposed end thereof. The packaging volume 30 is in fluid communication between the inlet and outlet ports 26 and 28, respectively. The inlet port 26 supplies the exhaust 13 from the combustion engine, and the outlet port 28 discharging an outgoing, purified exhaust gas stream 21.

The catalytic unit 14 of the apparatus 10 includes a first catalyst 20 having a first optimal processing temperature range for catalytically processing the gas stream of the exhaust 13, and a second catalyst 22 located downstream from the first catalyst 20. The second catalyst 22 exhibits a second lower optimal processing temperature range relative to the first temperature range for catalytically processing the gas stream subsequent to the first catalyst 20. In particular, the first catalyst 20 is adapted to facilitate the reaction of NOx with hydrocarbons to yield nitrogen-containing intermediates such as amines, ammonia, organo-nitrogen species and oxygenates. These intermediate species desorb into the gas phase along with activated NOx species. The second catalyst 22 is adapted to facilitate the reaction of these intermediates for further reduction into $N_2$. The inventors believe the first catalyst not only converts some of the NOx directly to N2, but also produces intermediate species from the remaining NOx that further react to form N2 over the second catalyst.

In a preferred embodiment of the present invention, the first catalyst 20 is composed of a catalytically active metal-containing alumina ($Al_2O_3$) material, preferably a metal-containing γ-alumina material, and the second catalyst 22 is composed of a catalytically active metal-containing zeolite material, preferably a metal-containing ZSM-5 material. The first and second catalysts 20 and 22 are generally structurally arranged into catalyst beds which may be in the form of powders, pellets, particles, washcoated or formed monoliths such as a honeycomb structure, and the like.

The metal of the first catalyst 20 is preferably selected from silver, indium, gallium, tin, cobalt, and mixtures thereof, and more preferably from silver. The loading of the metal of the first catalyst 20 is preferably from about 1 to 15 wt % based on the total weight of the first catalyst, and more preferably from about 2 to 5 wt %. With the use of a reductant in the exhaust 13, a metal loading of at least 2% is preferred. In a preferred embodiment of the present invention, the first catalyst 20 is composed of silver-containing alumina catalyst (Ag/alumina).

It has been found that alumina formed by a sol-gel method produces a material having unique properties for utilization in lean $NO_x$ catalytic treatment of oxygen rich exhaust. Various methods of forming the alumina component were investigated. In one embodiment, γ-alumina was prepared by a complexing agent-assisted, sol-gel method. Another embodiment had the γ-alumina support material prepared by sol-gel method without the use of a complexing agent.

The alumina component of the first catalyst 20 is preferably synthesized via sol gel methods using a complexing agent in combination with a washing step employing an alcohol, such as, for example, 2-propanol. The sol gel method is advantageous in that the resulting product is characterized by a basic pH, excellent hydrothermal stability, and optimized metal dispersion on the alumina component to maximize loading capacity and uniformity, thereby enhancing greater reduction of $NO_x$ compared to conventional preparation methods. Specific details on the sol-gel process can be found in Example 2 hereinafter. Further details on the synthesis of alumina via the sol-gel process can be found in U.S. Pat. Nos. 6,703,343 and 6,706,660, the teachings of which are incorporated herein by reference to the extent they do not conflict herewith.

The metal doping or loading of the alumina material is preferably accomplished in one of two ways. In one method, the subject metal dopant is solubilized in the water that is used to stop gelation during the sol-gel procedure described above.

In a second method, the calcined sol-gel γ-alumina is doped with a metal by an incipient wetness impregnation method. In the preferred incipient wetness impregnation method, the calcined powder sol-gel prepared γ-alumina is brought into contact with a solution of the appropriate metal. The solution of the metal is present in an amount equal to or greater than the total pore volume of the γ-alumina sample. The pore volume of γ-alumina prepared is preferably between about 0.5 and about 2.0 cc/g of alumina.

To form an indium or indium oxide doped γ-alumina by the incipient wetness method an appropriate amount of $In(NO_3)_3$ (or $InCl_3$) is dissolved in a water solution and brought into contact with the sol-gel γ-alumina. The indium or indium oxide doped γ-alumina catalyst is then calcined at 600° C. for about 5 hours.

Tin or tin oxide doped γ-alumina is prepared in the same manner using $SnCl_3$ in an ethanol solution instead of water. The tin or tin oxide doped γ-alumina catalyst is calcined at 600° C. for about 5 hours and then at 800° C. for about 2 hours.

A third promising metal promoter evaluated is gallium or gallium oxide. A gallium or gallium oxide doped γ-alumina is prepared by exposing the γ-alumina to a water solution of $Ga(NO_3)_3$—$H_2O$ which is added to the aluminum oxide gel during the γ-alumina preparation in the sol-gel method. The gallium or gallium oxide doped γ-alumina catalyst is calcined at 600° C. for about 5 hours to form oxides of gallium loaded alumina.

The metal of the second catalyst 22 is preferably selected from copper, iron, cobalt, mixtures thereof, and more preferably from copper. The loading of the metal of the second catalyst 22 is preferably from about 2 to 15 wt % based on the total weight of the second catalyst, and more preferably from about 3 to 11.5 wt %. In a preferred embodiment of the present invention, the second catalyst 22 is composed of a copper containing zeolite catalyst (Cu/zeolite). The zeolite component may be selected from any suitable zeolite including, but not limited to, ZSM-5, ZSM-11, ZSM-35, MCM-22, MCM-49, Beta, MCM-56, ITQ-13, and MCM-68. A preferred zeolite is ZSM-5. Further details on metal doping or loading the ZSM-5 component can be found in Example 1 hereinafter.

The first and second catalysts 20 and 22 of the catalytic unit 14 are enclosed within the packaging volume 20 of the housing 24 with the first catalyst 20 positioned upstream from the second catalyst 22. The first and second catalysts are present in an amount ratio ranging from about 1:2 to 2:1, with a ratio of about 1:1 being preferred. In this embodiment, the first and second catalysts 20 and 22 are arranged in juxtaposition to one another. Alternatively, the first and second catalysts 20 and 22 are maintained spaced apart at some distance L, from one another. Typically, performance increases as the residence time decreases. The first catalyst 20 in combination with the second catalyst 22 function to convert and reduce the presence of $NO_x$ in the gas stream of the exhaust 13 entering through the inlet port 26 and exiting out of the outlet port 28 of the apparatus 10 in a more purified form.

As discussed above, the exhaust 13 can be injected with a reductant before the catalytic unit 14 to enhance the catalytic reaction associated with converting $NO_x$ to $N_2$. The reductant can be tapped off the fuel tank 15 associated with the combustion engine 12 and injected into the exhaust 13 via a fuel injector or other suitable means. Other examples of suitable reductants in association with a diesel engine include dodecane, ethanol, propane, diesel fuel, kerosene, diesel-range paraffins, diesel-range non-aromatic streams, and the like. Other examples of suitable reductants in association with a gasoline engine include gasoline, propane, ethanol, octane, and the like.

EXAMPLE 1

A sample of copper containing ZSM-5 zeolite catalyst was produced by preparing a solution containing 68 grams of copper (II) nitrate hydrate and 1000 ml of deionized water. Thereafter, 200 grams of ZSM-5 zeolite crystal were added while the solution was stirred. The resulting mixture was stirred for about 1.5 hours and then the pH was adjusted to 7.25 by the addition of 35.7 grams of $NH_4OH$. The stirring of the mixture continued for about 1 hour. The zeolite mixture was filtered, and washed with 1000 ml of deionized water. The filtrate was dried overnight at about 85° C. The exchanged zeolite was then air calcined by ramping the temperature at a rate of 2° C./min to 550° C., holding for about 2 hours, and then cooled to room temperature. Copper analysis indicated the copper loading was about 11.5 wt. %.

A sample with 3 weight % copper loading was prepared using the above procedure by varying the amount of copper (II) nitrate hydrate.

EXAMPLE 2

γ-Alumina support was prepared by utilizing a complexing agent-assisted sol gel method. 500 grams of aluminum isopropoxide (AIP) (98%+, Aldrich Chemical Company, Inc.) was dissolved in 600 ml of 2-methyl-2,4-pentanediol (MPD) (99% Aldrich Chemical Company, Inc) in a beaker. The resulting mixture was stirred vigorously with a mechanical polyethylene stirrer. Once the mixture was mixed homogenously, the beaker was placed in a constant temperature bath at a temperature of about 120° C. and stirred continuously for about an hour. Once all the AIP was dissolved, a clear yellowish green solution was obtained. The AIP reacts with MPD to yield 2-propanol in the form of a vapor at the 120° C. reaction condition and the solution begins to gel. Once the gelation is completed after 4 hours, 400 ml of water was added to terminate the gelation and yield a white precipitate (aluminum hydroxide). The white solid product was redispersed in water and aged at 90° C. overnight under constant stirring.

After aging overnight, 600 ml of 2-propanol was added to remove the water from the pores of the precipitate. Although 2-propanol or methanol is preferred, any organic solvent having a surface tension of about equal to or less than 30 mN/m will be useful. It is just necessary that the solvent have a surface tension significantly below that of water, which is about 72 mN/m. The slurry was vacuum filtered and dried at 90° C. in an oven for about 48 hours.

Calcination was carried out in a temperature programmed tube furnace with 5 L/min air flowing through it. A general calcinations schedule is as follows: ramp the temperature from 100° C. to 700° C. at about 1° C./min; maintain at 700° C. for a prescribed time, and turn off the heat and continue air over the alumina until the temperature is reduced to 100° C. During calcinations, a selected amount of water (e.g., 2% to 6% or more) can be added to partially sinter the powders.

This procedure can be controlled so as to yield γ-alumina with pre-aging surface areas greater than about 200 $m^2/g$, pre-aging pore volumes of from about 1.0 to 2.0 cc/g and pre-aging pore sizes averaging from about 4 to 20 nm. The resulting alumina product had a surface area of from about 200 to 230 $m^2/g$.

EXAMPLE 3

Several samples of silver containing γ-alumina catalysts were prepared via the incipient wetness impregnation technique. Aqueous silver nitrate or silver sulfate solution was added drop-wise and mixed with the γ-alumina product of Example 2. The volume of the nitrate solution was calculated to substantially match the pore volume of the γ-alumina product, which was about 1.4 ml per gram of γ-alumina. Thus, 0.322 grams of silver nitrate was dissolved in 14 ml of water and mixed with 10.0 grams of alumina. The impregnated sample was then manually mixed with a spatula, dried overnight at 90-110° C., and calcined for about 5 hours at 600° C. in the presence of air. In another preparation, 0.2966 grams of silver sulfate was dissolved in 42 ml of water because of lower solubility, and this was added in three steps using 14 ml each time with drying and calcination between the steps. The silver loading in the catalyst was 2 weight % based on the total weight of the catalyst.

EXAMPLE 4

Two catalysts were prepared by dissolving 500 g aluminum isopropoxide (AIP) in 600 ml 2-methyl-2,4-pentanediol (MPD) using the sol-gel procedure described in Example 2. In this example, however, as part of the preparation, 4.025 g Ag(NO3) or 3.7075 g Ag2(SO4) was dissolved in 600 mL propanol and added to the slurry during the propanol washing step of Example 2. The slurry was mixed for about an hour and the resulting products were vacuum filtered to yield the catalysts.

EXAMPLE 5

Catalyst evaluation experiments were conducted in a quartz reactor heated in an electric furnace. A gas mixture was passed over a catalyst bed supported in the quartz reactor. The gas mixture contained 1000 ppm NO (nitric oxide), 1000 ppm propylene as a reductant, and 9% oxygen with the remaining portion composed of helium. The total flow rate of the gas was about 1500 ml/minute, and the catalyst volume was about 3.0 ml to yield a gas hourly space velocity (GHSV) of 30,000. The temperature of the catalyst was increased from 150° C. to 550° C. and then reduced back to 150° C. Data were recorded as the temperature was reduced. In one evaluation, 1.5 ml of Ag/alumina catalyst was placed upstream of 1.5 ml of Cu/ZSM-5 catalyst. In the second and third evaluations, the catalysts were evaluated individually. The copper loading was about 11.5 wt % based on the total weight of the copper containing catalyst. The alumina catalyst contained 2 wt % silver.

Figure 3:
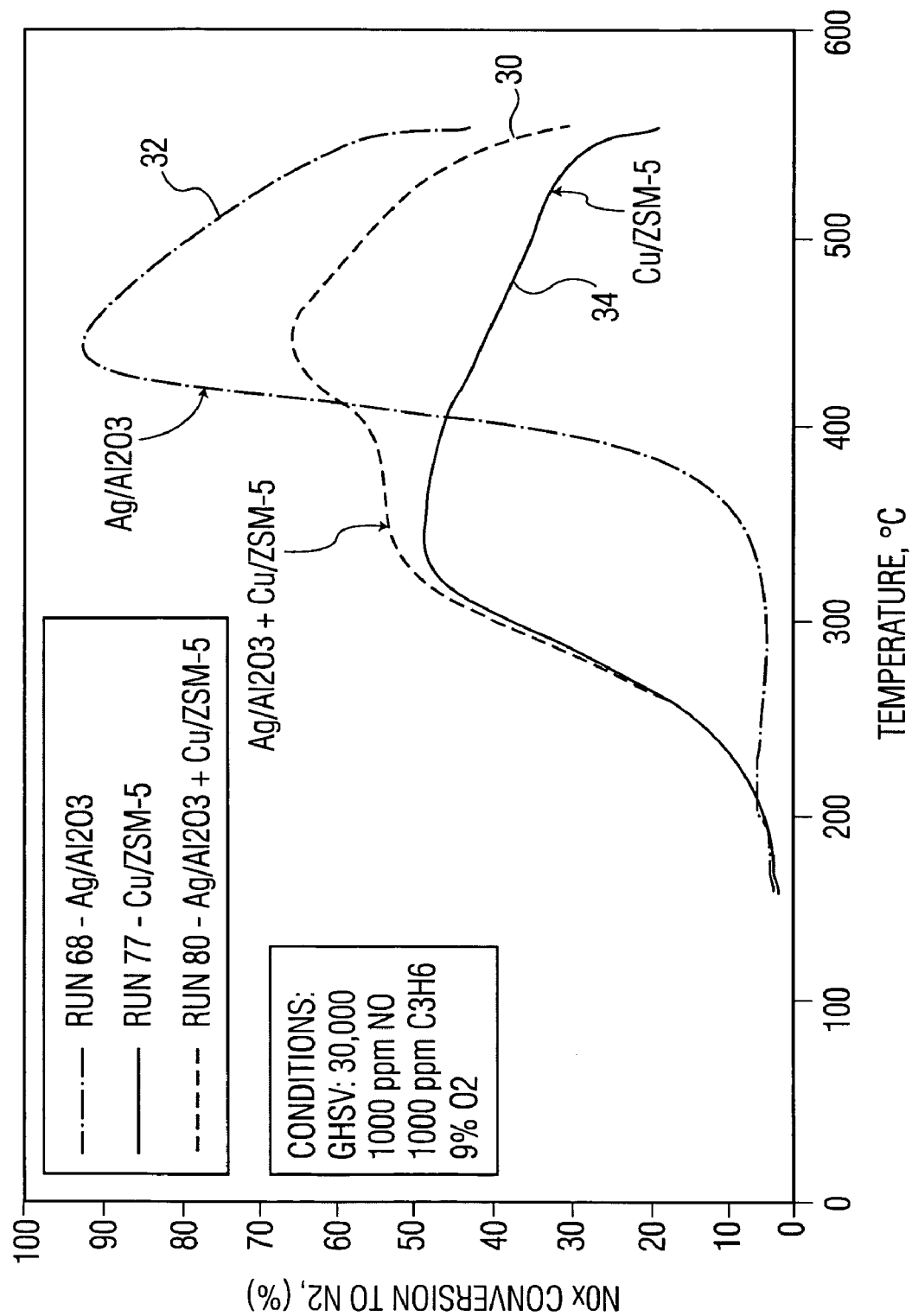
FIG. 3 is a graph comparing the performance of the combination of Ag/Alumina and Cu/ZSM-5 catalysts to the performances of the catalysts individually in accordance with the present invention in the absence of water.

As shown in the graph of FIG. 3, the results of the evaluations compare the performance of the combination of catalysts to the performances of the catalysts individually. The graph shows that the combination of catalysts as represented by curve 30 exhibited a broader temperature window of activity in removing $NO_x$ when compared to the individual catalysts as represented by curves 32 and 34, respectively.

EXAMPLE 6

A catalyst evaluation experiment was conducted in a quartz reactor heated in an electric furnace in accordance to the procedures described in Example 5 except the gas mixture passing over the catalyst bed included 7% water. Further evaluations were made to compare the effects of copper loading at about 3 wt % and about 11.5 wt %, respectively, based on the total weight of the copper containing catalyst.

Figure 4:
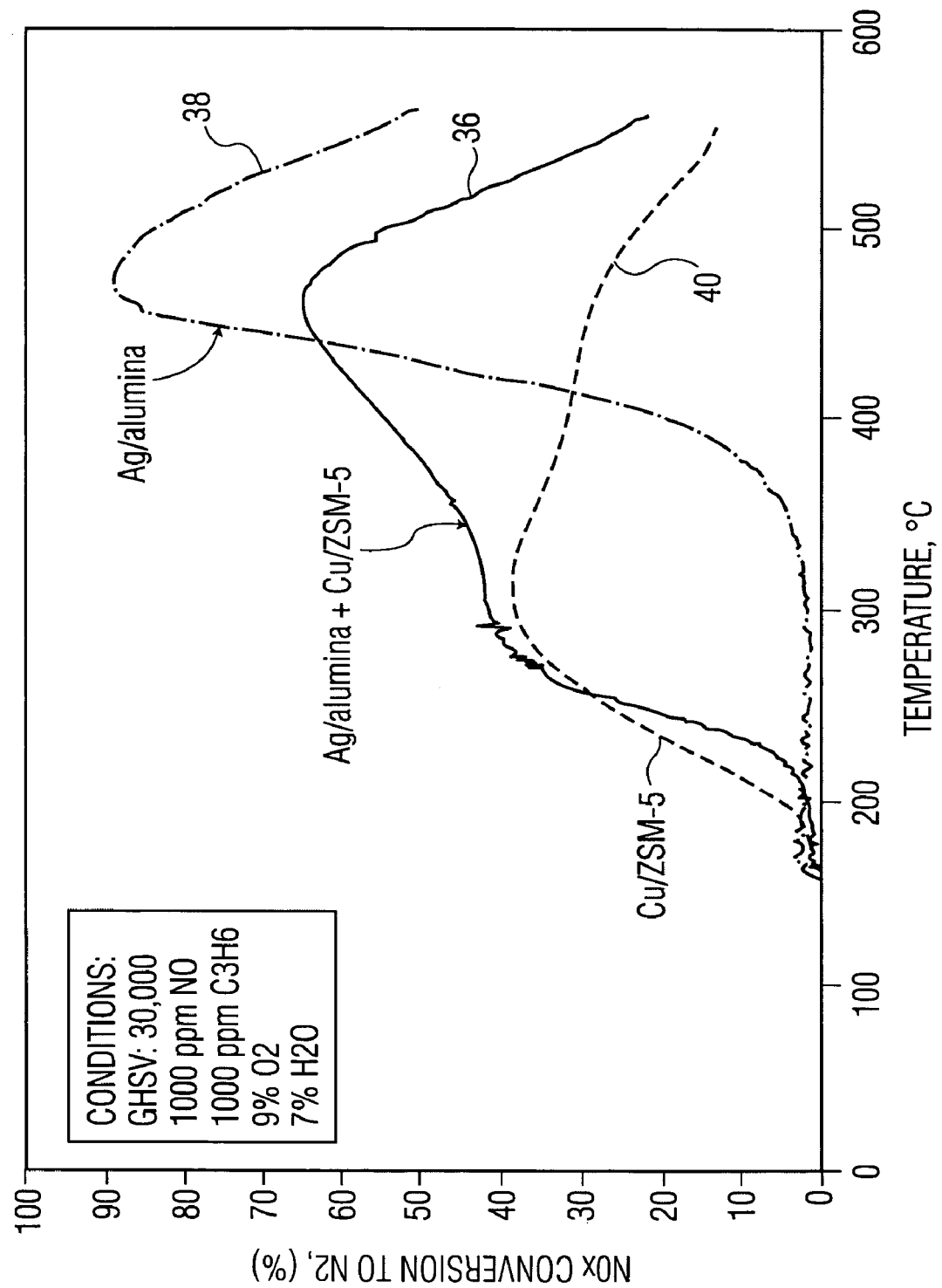
FIG. 4 is a graph comparing the performance of the combination of Ag/Alumina and Cu/ZSM-5 catalysts to the performances of the catalysts individually in accordance with the present invention in the presence of water.

As shown in the graph of FIG. 4, the results of the evaluations compare the performance of the combination of catalysts to the performances of the catalysts individually. The graph shows that the combination of catalysts as represented by curve 36 maintains a broader temperature window of catalytic activity in removing $NO_x$ even in the presence of water than the individual catalysts as represented by curves 38 and 40, respectively.

Figure 5:
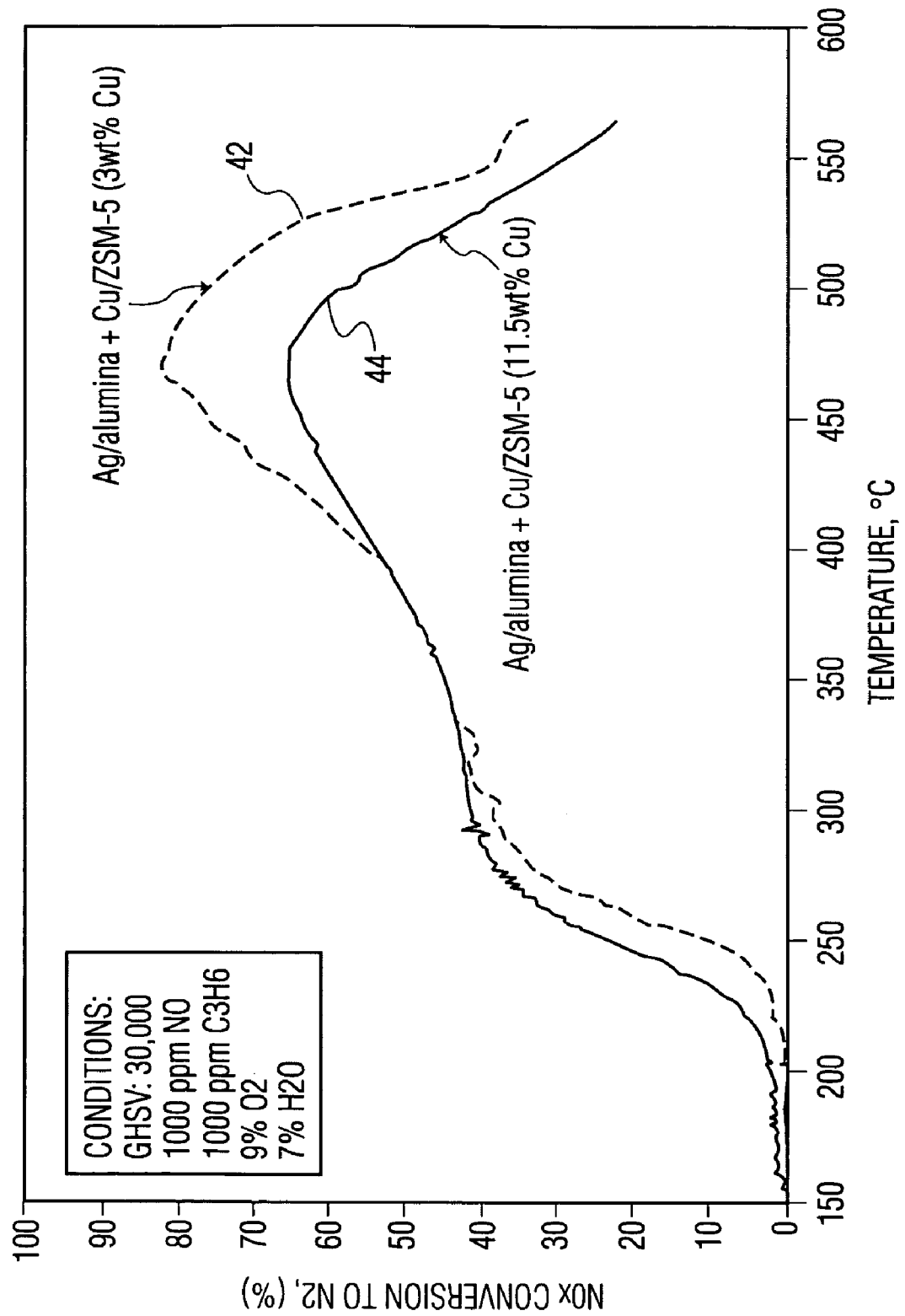
FIG. 5 is a graph comparing the performances of the combination of Ag/Alumina and Cu/ZSM-5 catalysts at different copper loadings in accordance with the present invention.

As further shown in FIG. 5, catalytic activity at the higher end of the temperature range was observed to be improved with lower Cu loading at about 3 wt % represented by curve 42 as compared to the Cu loading of about 11.5 wt. % based on the total weight of the copper containing catalyst represented by curve 44.

EXAMPLE 7

The Ag/alumina and Cu/ZSM-5 catalysts were wash coated onto a 1" diameter by 3" long monolith and evaluated with dodecane (a diesel range molecule) as a reductant. The evaluations were carried out in a quartz reactor heated in an electric furnace. A gas mixture was passed over a catalyst bed supported in the quartz reactor. The gas mixture contained 500 ppm NO (nitric oxide), 3000 ppm dodecane as a reductant, 50 ppm propene, 500 ppm CO, 8% carbon monoxide, 7% water, and 9% oxygen with the remaining portion composed of helium. The gas hourly space velocity (GHSV) was adjusted to about 35,000. The temperature of the catalyst was increased from 150° C. to 550° C. and then reduced back to 150° C. Data were recorded as the temperature was reduced. In one evaluation, the Ag/alumina catalyst was placed upstream of the Cu/ZSM-5 catalyst. In the second and third evaluations, the catalysts were evaluated individually.

Figure 6:
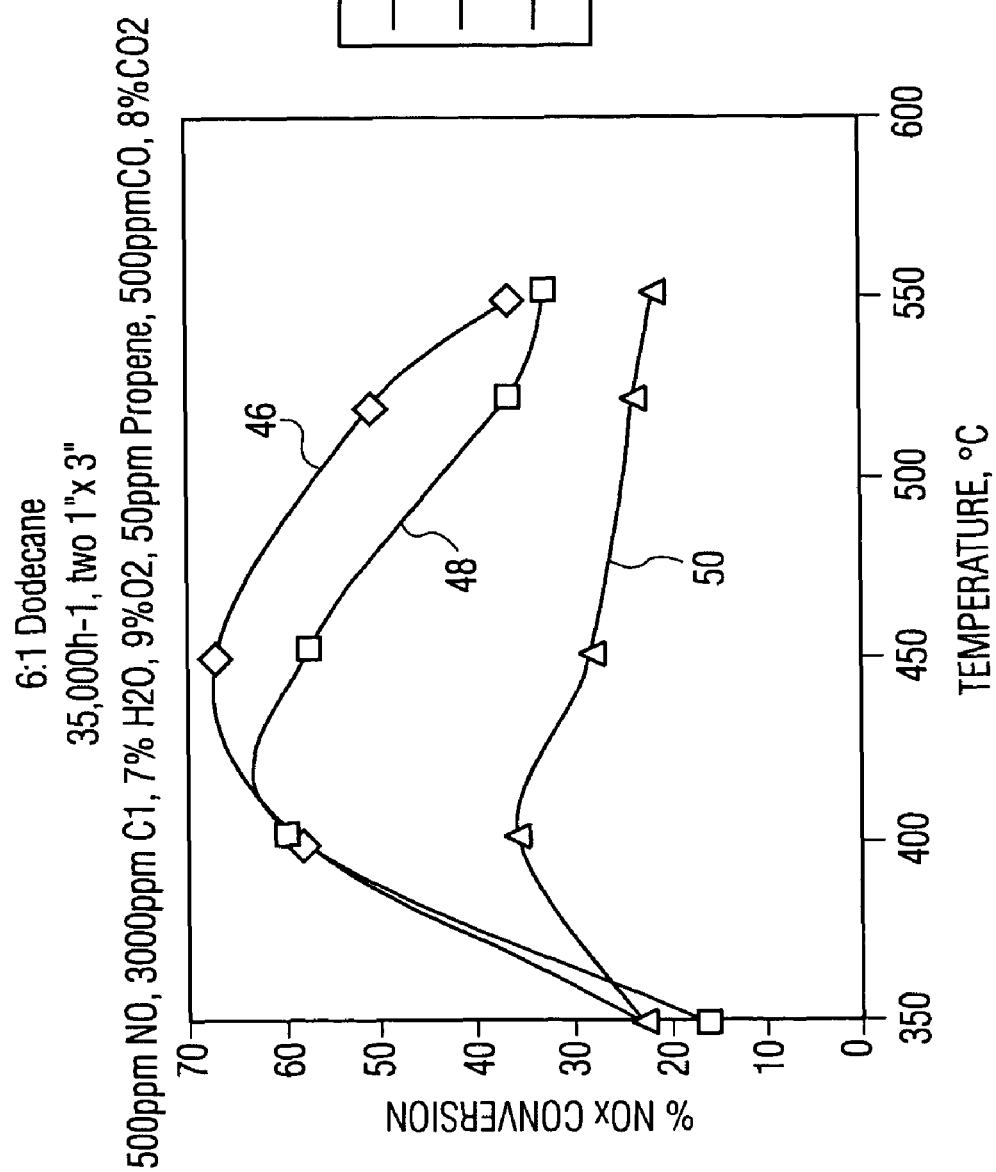
FIG. 6 is a graph comparing the performance of the combination of Ag/Alumina and Cu/ZSM-5 catalysts to the performances of the catalysts individually in the presence of a dodecane reductant in accordance with the present invention.

As shown in the graph of FIG. 6, the results of the evaluations compare the performance of the combination of catalysts to the performances of the catalysts individually. Surprisingly, the performance of the combination of catalysts as represented by curve 46 was observed to be better than the additive performance of the individual catalysts as represented by curves 48 and 50, respectively.

EXAMPLE 8

A set of ZSM-5 powders of varying crystal sizes and silica/alumina ratios were exposed to steam at a concentration of 10% water vapor for about 16 hours at 600° C. to simulate aging induced by engine exhaust. The powders were subsequently pelleted and tested or evaluated for $NO_x$ conversion. A second set of catalysts was prepared from same starting powders except the catalysts were impregnated with iron prior to being exposed to the steam. The second set of iron containing catalysts was prepared by adding 5.4 grams of iron (III) nitrate nonahydrate to 40 grams of deionized water under constant stirring. The resulting solution was added drop-wise to mix with 30 grams of ZSM-5. The impregnated powder was then dried overnight at about 85° C. The iron-containing ZSM-5 catalyst was air calcined at about 400° C. for about 3 hours. The resulting catalysts contained 2.5 wt % iron.

The catalysts were evaluated using a quartz reactor heated in an electric furnace. A gas mixture containing 1000 ppm NO (nitric oxide), 1000 ppm propylene, 9% oxygen and the remaining portion being helium, was passed over the catalyst bed supported in the quartz reactor. The total flow rate of the gas mixture was about 1500 ml/min, and the catalyst volume was maintained at about 3.0 ml to yield a gas hourly space velocity (GHSV) of about 30,000. The temperature of the catalyst was increased from 150° C. to 550° C. and then reduced to 150° C. Data was recorded during the temperature reduction. The results are summarized in Table 1 below.

TABLE 1

| Crystal size, μm | $SiO_2/Al_2O_3$ | Maximum $NO_x$ conversion, % | |
| --- | --- | --- | --- |
| | | H-ZSM-5 | Fe-ZSM-5 |
| 0.02-0.05 | 60 | 8 | 10 |
| 0.5-2.0 | 50 | 14 | 17 |
| 0.5-2.0 | 25 | 8 | 10 |
| 5-8 | 80 | 8 | 8 |

The data shows that an optimized catalyst is generally obtained at an intermediate crystal size (0.5-2.0 μm) and intermediate $SiO_2/Al_2O_3$ (50). Although the metal in the metal-containing zeolite (ZSM-5) was iron, Applicants anticipate similar results for other related metals including copper.

EXAMPLE 9

Figure 7:
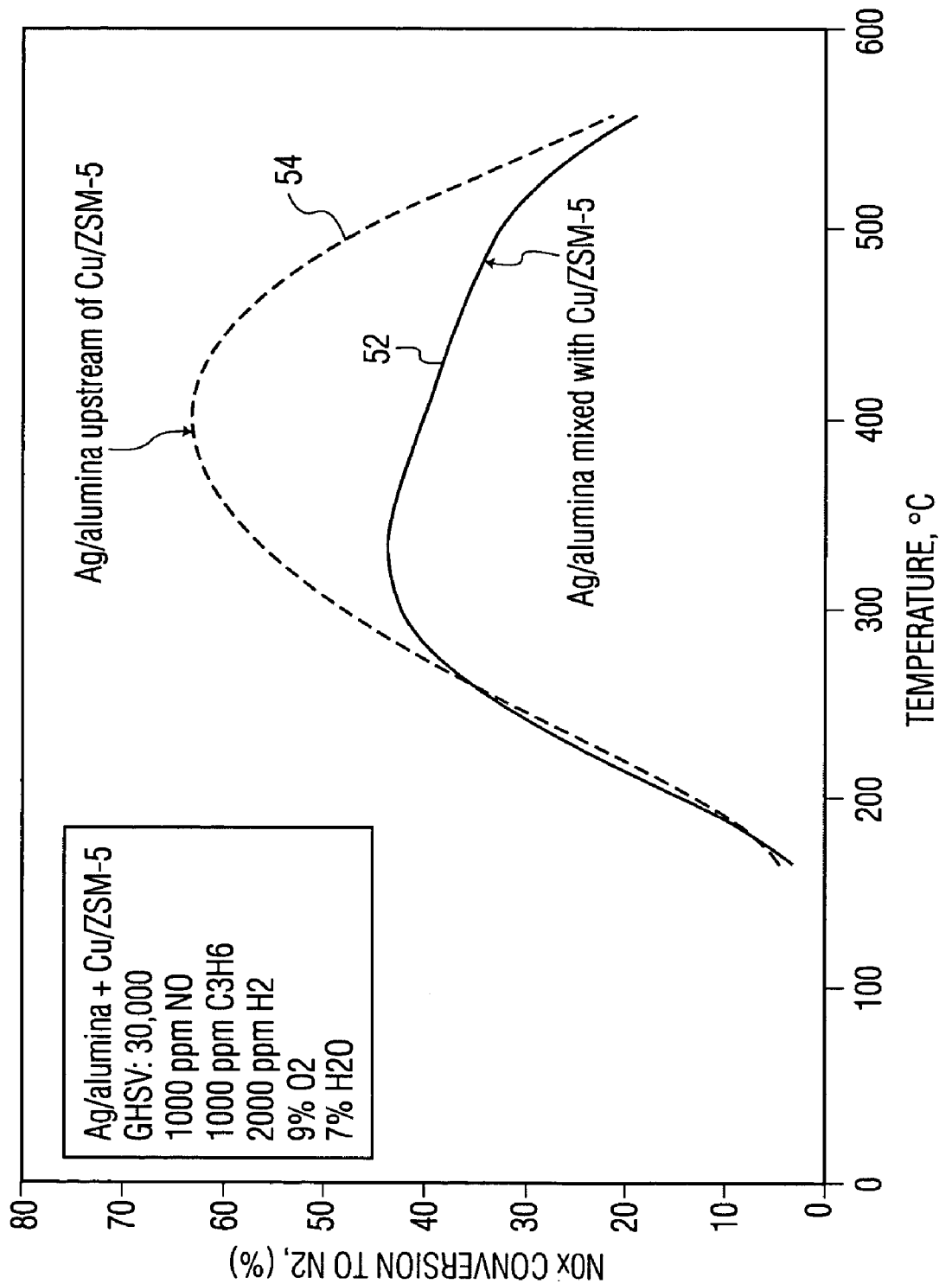
FIG. 7 is a graph comparing the performance of the combination of Ag/Alumina and Cu/ZSM-5 catalysts in different physical arrangements in accordance with the present invention.

An evaluation was implemented which tested a combination catalyst consisting of Ag/alumina and Cu/ZSM-5 located downstream therefrom, and a combination catalyst consisting of Ag/alumina intermixed with Cu/ZSM-5. The catalysts were evaluated using a quartz reactor heated in an electric furnace. A gas mixture containing 1000 ppm NO (nitric oxide), 1000 ppm propylene, 2000 ppm hydrogen, 9% oxygen and the remaining portion being helium, was passed over the catalyst bed supported in the quartz reactor. The total flow rate of the gas mixture was about 1500 ml/min, and the catalyst volume was maintained at about 3.0 ml to yield a gas hourly space velocity (GHSV) of about 30,000. The temperature of the catalyst was increased from 150° C. to 550° C. and then reduced to 150° C. Data was recorded during the temperature reduction. The results are shown in FIG. 7.

The results indicate that a mixed combination catalyst as represented by curve 52 operates less effectively than a staged catalyst having Ag/alumina upstream of Cu/ZSM-5 as represented by curve 54. The peak $NO_x$ conversion to $N_2$ was about 63% for the staged catalyst while the mixed catalyst had a peak $NO_x$ conversion to $N_2$ of about 43%.

EXAMPLE 10

Figure 8:
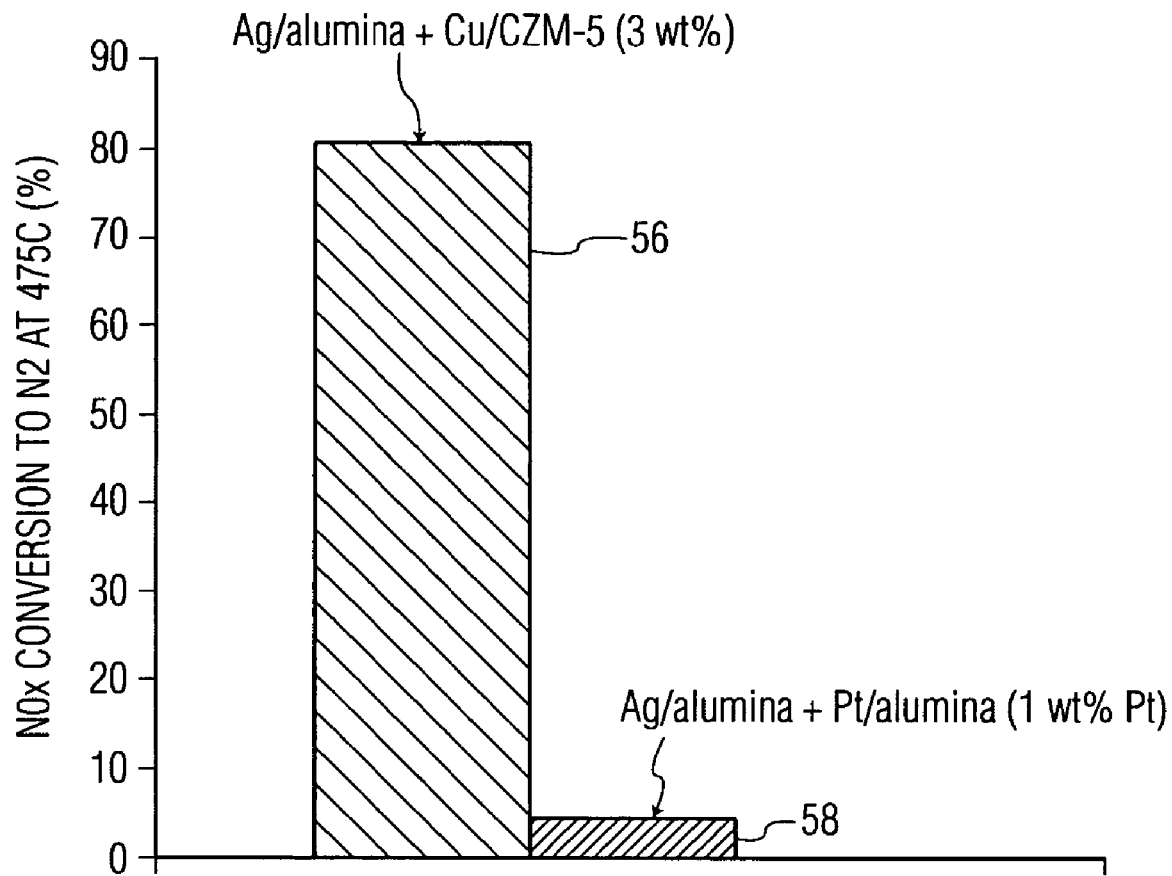
FIG. 8 is a graph comparing the performance of the combination of Ag/Alumina and Cu/ZSM-5 catalysts to the performance of the combination of Ag/Alumina and Pt/Alumina catalysts in accordance with the present invention.

A catalyst evaluation experiment was conducted in a quartz reactor heated in an electric furnace in accordance to the procedures described in Example 5 except the gas mixture passing over the catalyst bed included 7% water. The NOx removing activity was measured at 475° C. using the combination of Ag/alumina and downstream Cu/ZSM-5 catalysts with 3 wt % Cu loading, and the combination of Ag/alumina and downstream Pt/alumina with 1 wt % Pt loading. The results of the evaluation is shown in FIG. 8. The combination of Ag/alumina and downstream Cu/ZSM-5 catalysts exhibited 80% $NO_x$ conversion to $N_2$ as represented by bar 56, while the combination of Ag/alumina and downstream Pt/alumina exhibited 4% $NO_x$ conversion to $N_2$ as represented by bar 58.

Applicants believe that the initial reaction of NOx with hydrocarbons on Ag/alumina catalysts results in the formation of intermediate species such as ammonia, amine, organo-nitrogen species, and oxygenates. These intermediates desorb into the gas phase together with activated $NO_x$ species. Further homogenous gas reaction leads to $N_2$ formation. These species are reacted on Cu/ZSM-5 for further reduction to $N_2$. However, the same species are reacted on Pt/alumina and oxidized to $NO_x$ which drastically reduced $NO_x$ conversion.

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. An apparatus for catalytically processing a gas stream passing therethrough to reduce the presence of NOx therein, said apparatus comprising:
    a first catalyst positioned in a relatively upstream portion of said gas stream, said first catalyst, comprising silver containing γ-alumina for catalytically processing the gas stream, said first catalyst having a first temperature at which peak NOx reducing catalytic activity occurs, said first catalyst being adapted for both converting a portion of the NOx directly to $N_2$, another portion to nitrogen-containing intermediates, with a portion of NOx remaining; and
    a second catalyst positioned in a relatively downstream portion of said gas stream from said first catalyst, said second catalyst comprising copper containing ZSM-5 having a crystal size in the range of from about 0.5 μm to 2.0 μm and a silicon to aluminum ratio of about 50, and a copper content of about 3% by weight based on the total weight of the second catalyst, for catalytically processing the gas stream downstream from the first catalyst, said second catalyst having a second temperature at which peak NOx reducing catalytic activity occurs, said second catalyst being adapted to facilitate the reaction of the remaining NOx and intermediates for further reduction into $N_2$, wherein the value of the second temperature is lower than the value of the first temperature.

2. The apparatus of claim 1, wherein the first and second catalysts are abutted against one another.

3. The apparatus of claim 1, wherein the first and second catalysts are spaced apart at a distance from one another.

4. The apparatus of claim 1, wherein the first and second catalysts are present in an amount ratio ranging from about 1:2 to 2:1 by volume.

5. The apparatus of claim 1, wherein the first and second catalysts are present in an amount ratio of about 1:1 by volume.

6. The apparatus of claim 1, further comprising an injector located upstream from the first catalyst for introducing a reductant to the gas stream.

7. The apparatus of claim 6, wherein the reductant is a hydrocarbon compound.

8. The apparatus of claim 1, wherein the silver is present in an amount of from about 1 to 15 weight percent based on the total weight of the first catalyst.

9. The apparatus of claim 1, wherein the silver is present in an amount of from about 2 to 5 weight percent based on the total weight of the first catalyst.

10. The apparatus of claim 1, wherein the γ-alumina is derived from a sol gel synthesis process.

11. The apparatus of claim 1, wherein the first and second catalysts are in the forms selected from powders, pellets, monoliths, fluidized beds, and combinations thereof.

12. A method for catalytically processing a gas stream to reduce the presence of $NO_x$ therein, said method comprising the steps of:
    positioning a first catalyst in a relatively upstream portion of said gas stream;
    positioning a second catalyst in a relatively downstream portion of said gas stream from said first catalyst;
    delivering the gas stream to said first catalyst comprising silver containing γ-alumina for catalytically processing the gas stream, said first catalyst being adapted for both converting a portion of the NOx directly to $N_2$, another portion to nitrogen-containing intermediates, with a portion of NOx remaining, wherein said first catalyst includes a first temperature at which peak NOx reducing catalytic activity occurs; and
    conveying the gas stream from the first catalyst to said second catalyst comprising copper containing ZSM-5 having a crystal size in the range of from about 0.5 μm to 2.0 μm and a silicon to aluminum ratio of about 50, and a copper content of about 3% by weight based on the total weight of the second catalyst, for catalytically processing the gas stream, wherein said second catalyst includes a second temperature at which peak NOx reducing catalytic activity occurs, said second catalyst being adapted to facilitate the reaction of the remaining NOx and intermediates for further reduction into $N_2$, whereby the value of the second temperature is lower than the value of the first temperature.

13. The method of claim 12, prior to delivery of the gas stream to the first catalyst, further comprising the step of injecting into the gas stream a reductant in an amount sufficient to facilitate the reduction of $NO_x$ in the gas stream.

14. The method of claim 12, further including the step of spacing apart said first and second catalysts.

15. The method of claim 13, further including the step of spacing apart said first and second catalysts.

* * * * *